Sept. 29, 1959    S. S. BOARD, JR., ET AL    2,906,063
GUIDE GRINDER

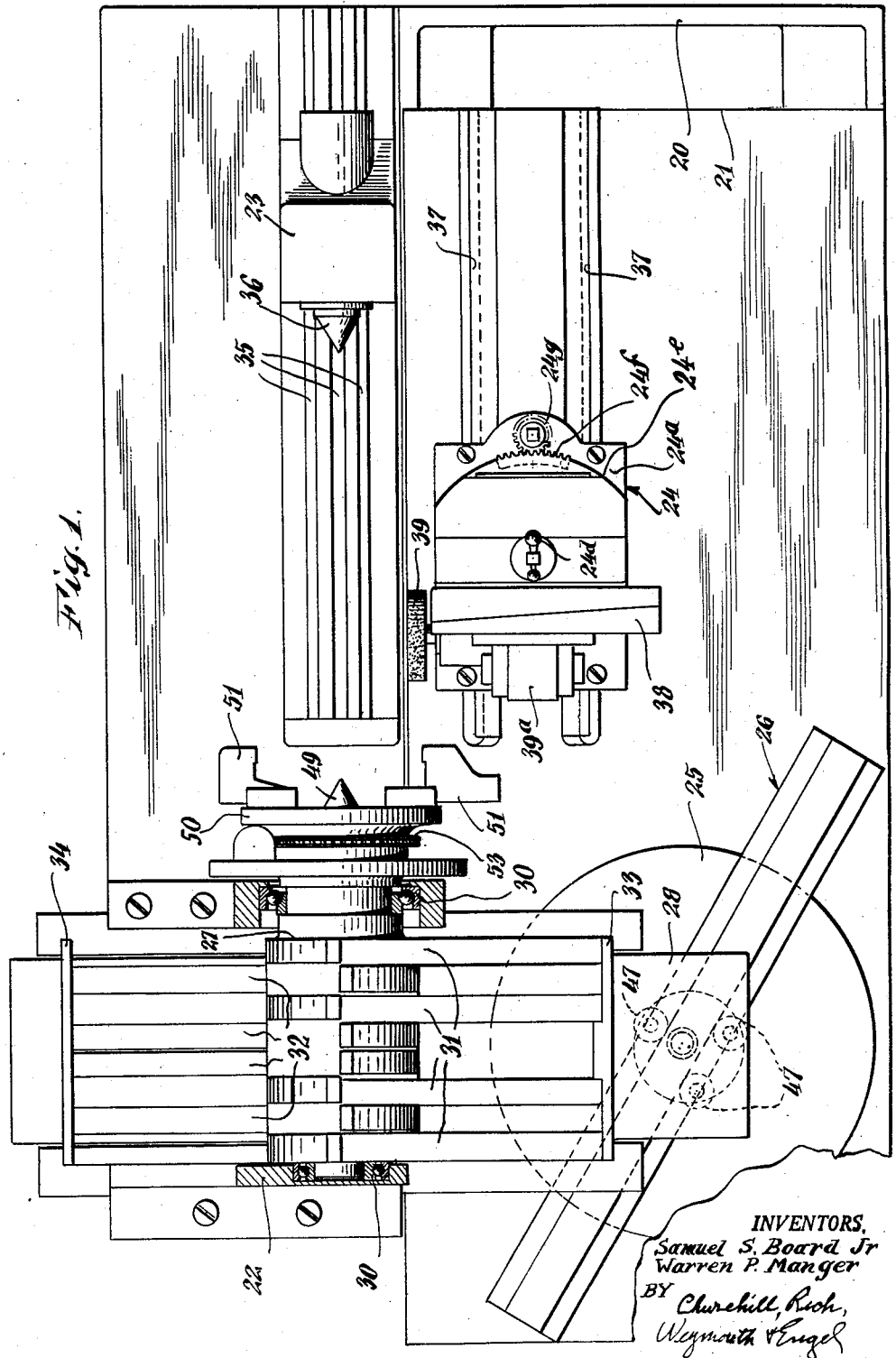

Filed Sept. 2, 1955    5 Sheets-Sheet 2

INVENTORS
SAMUEL S. BOARD, JR.
WARREN P. MANGER
BY
Byerly, Townsend, Watson & Churchill
ATTORNEYS

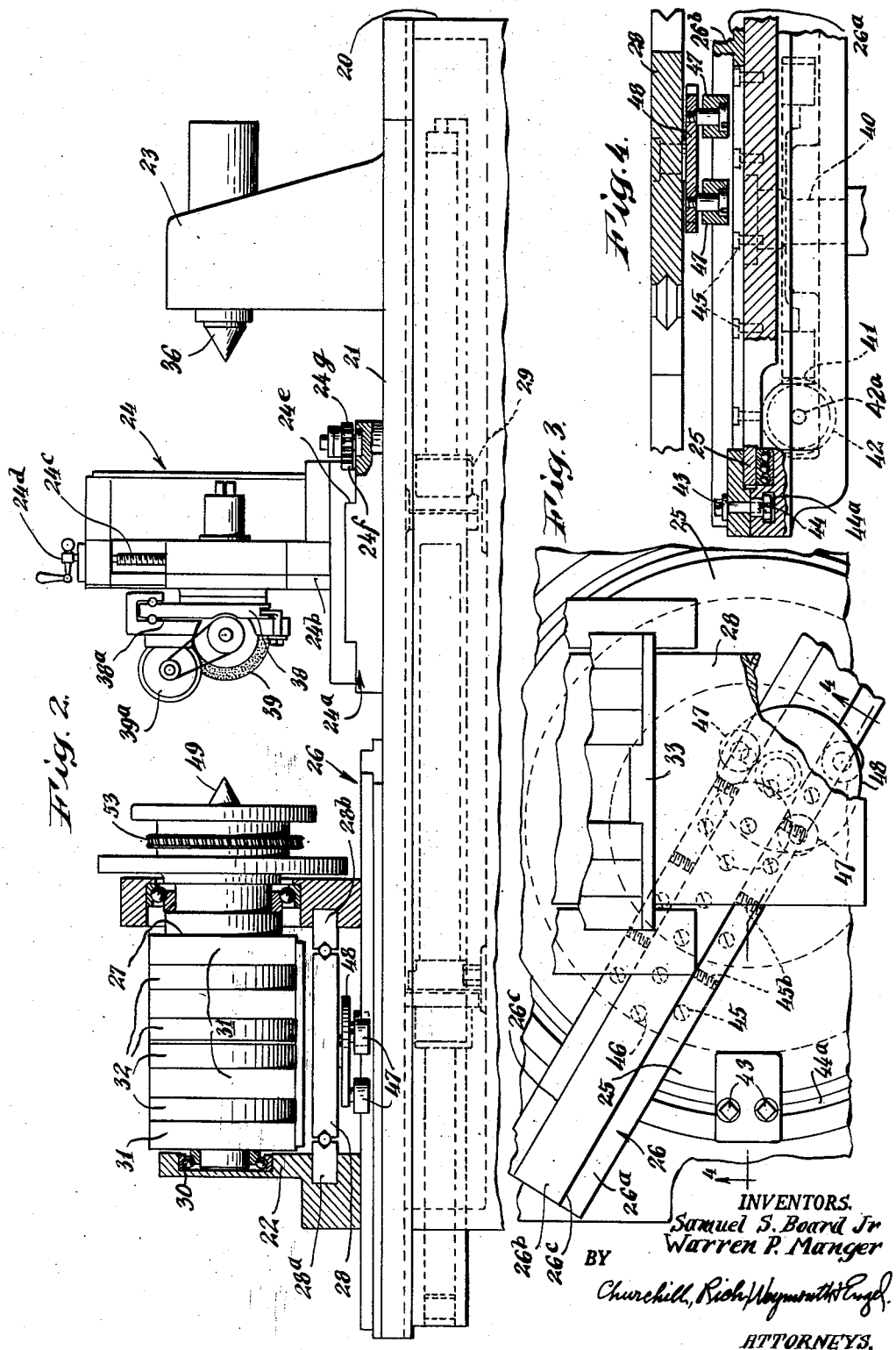

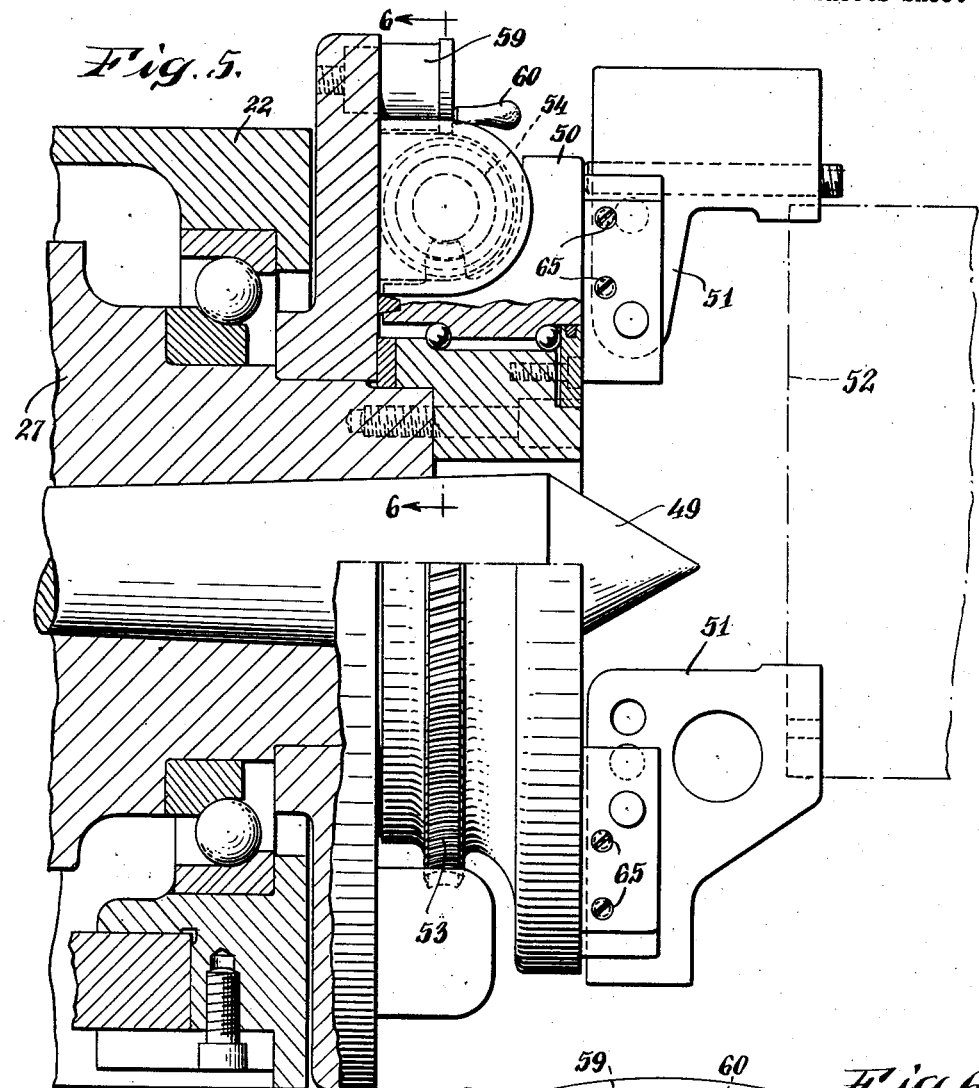
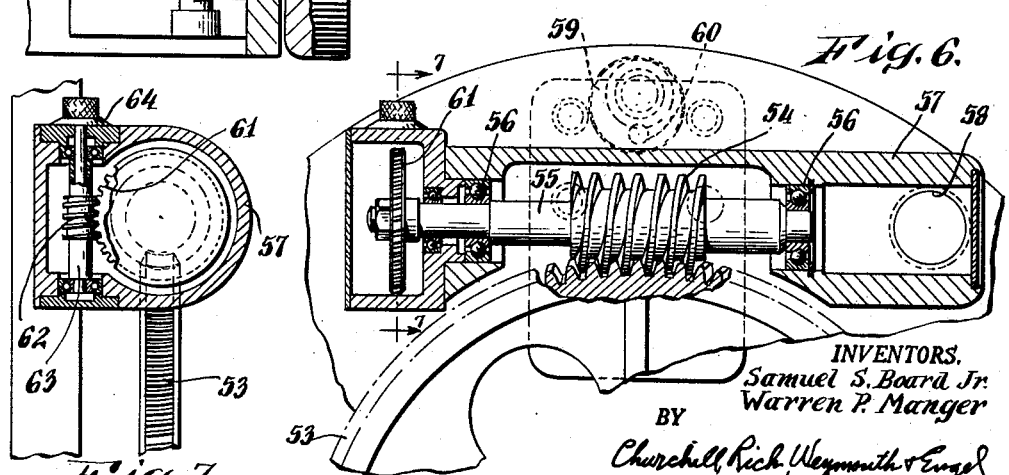

$\theta$ – Helix Angle of Pitch Line (Nominal)
$\theta_1$ – Helix Angle of Inside of Land (Inside Diameter)
$\theta_2$ – Helix Angle of Outside of Land (Outside Diameter)

INVENTORS.
Samuel S. Board Jr.
Warren P. Manger
BY
Churchill, Rich, Weymouth & Engel
ATTORNEYS.

United States Patent Office 2,906,063
Patented Sept. 29, 1959

2,906,063

GUIDE GRINDER

Samuel S. Board, Jr., Snyder, N.Y., and Warren P. Manger, New Haven, Conn., assignors to Farrel-Birmingham Company Inc., Buffalo, N.Y., a corporation of Connecticut Application September 2, 1955, Serial No. 532,311

14 Claims. (Cl. 51—50)

The present invention relates to a method of finishing helical guides and other cylindrical cams and to a machine for performing said method. More particularly, it relates to a method of and machine for flat finish grinding the side surfaces or lands of a helical guide or cylindrical cam so that all points of the lands on any radius from the axis of the cylindrical member will be flat and contain all the points of the width of the land.

Helical guides of the type to which the present invention is directed are used in Farrel-Sykes gear generating machines for controlling the movements of gear-shaped cutters in cutting spiral and herringbone gears. Such helical guides for cylindrical cams have an axial length longer than the diameter of the cylindrical member and are produced by milling the helical grooves in a cylindrical member as accurately as possible and then checking and hand scraping the sides or lands of the grooves to final desired contour. The hand finishing operation is extremely slow and costly and has repeatedly caused production bottlenecks. This will be appreciated from the fact that it frequently requires several weeks of one man's time to hand scrape a single guide to final contour.

After considerable discussion, research and mathematical investigation by the makers of the Farrel-Sykes gear generating machines, the feasibility of constructing a guide or helix grinder was considered to be sound.

From a theoretical viewpoint, all points of the width of these lands of a helical guide groove must have the same lead and thus the helix angle changes continuously from the innermost to the outermost part of the land along a radius. Therefore a grinding wheel whose axis is perpendicular to the shaft axis of the guide must theoretically have a zero radius to grind a flat land, otherwise the grinding wheel will interfere with the innermost and outermost helices of the land. However, because all grinding wheels do have definite radii, it has been heretofore considered impossible to flat finish grind the lands of such helical grooves.

Accordingly, the present invention contemplates flat finish grinding of the lands of helical guides or cams whereby a substantial saving in the time and hence in the cost of performing the finishing operation will be realized. The present invention also has as one of its objects the provision of a machine for carrying out the flat finish grinding of the lands of helical guides or cams so that the amount of out of flatness will be of the order measured in millionths of an inch.

The foregoing and other objects of the invention as may hereinafter appear, are accomplished by resorting to a so-called "twisting the axis" of a grinding wheel so that the grinding surface thereof will be brought into tangential relation to the surface of the guide land from the innermost to the outermost parts of the land and, when so positioned, imparting to said grinding wheel while rotating on its axis, a motion of translation parallel to the shaft axis of the helical guide while simultaneously rotating the guide on its axis in synchronous relation to the motion of translation of the grinding wheel.

The invention will be better understood from the detailed description which follows, when considered in connection with the accompanying drawings, wherein:

Figure 1 shows a top plan view, with parts in section and parts broken away, of a machine for carrying out the objects of the invention.

Fig. 2 shows a front elevational view, with parts in section, of the machine of Fig. 1.

Fig. 3 shows, on an enlarged scale, a plan view of the sine bar carrier and slide operable thereby for obtaining the synchronous motion between the grinding wheel and the helical guide.

Fig. 4 shows a section taken substantially along the line 4—4 of Fig. 3.

Fig. 5 shows on an enlarged scale, partly in elevation and partly in section, details of the head stock for supporting the helical cam.

Fig. 6 shows a section taken along the line 6—6 of Fig. 5.

Fig. 7 shows a section taken along the line 7—7 of Fig. 6.

Figure 9:
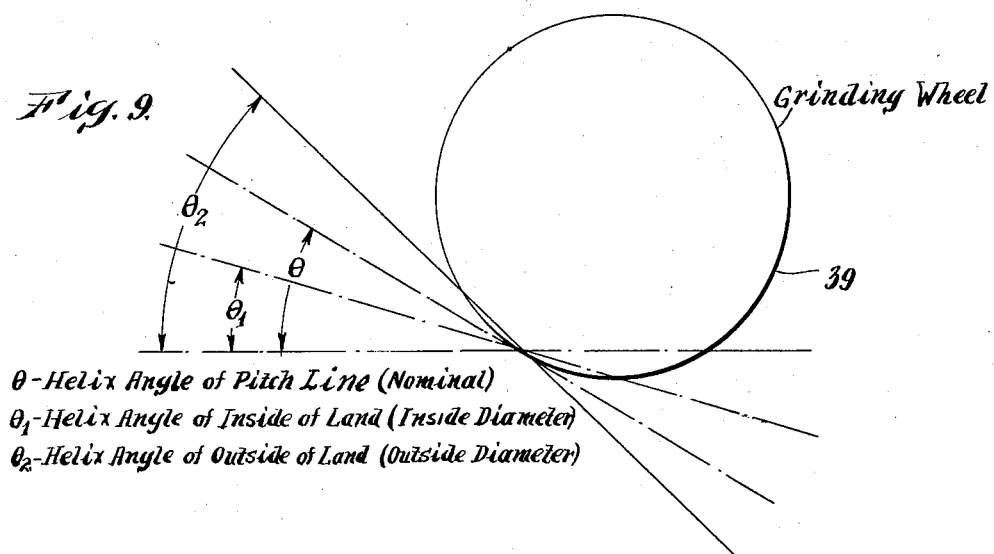

Fig. 9 diagrammatically shows the relationship of the peripheral surface of a grinding wheel mounted on an axis perpendicular to the shaft axis of the helical guide member.

Figures 10, 11, 12:
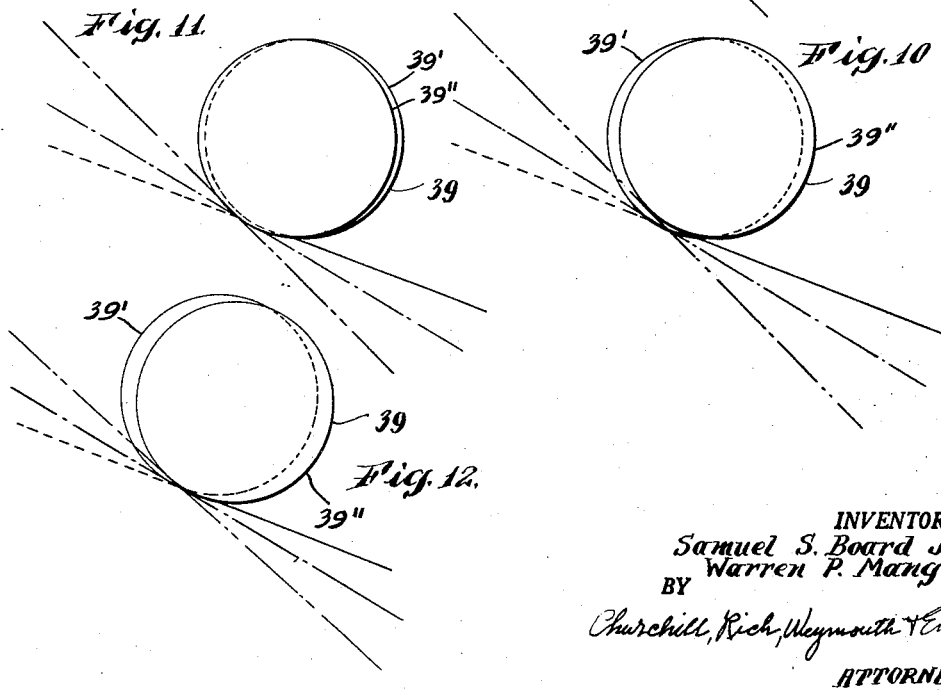

Figs. 10 and 11 diagrammatically show the grinding wheel of Fig. 9 with the axis thereof given an angle of precedence and an angle of succedence, in a horizontal plane, respectively.

Fig. 12 is a view similar to Fig. 10 showing the grinding wheel with the axis thereof given an angle of precedence in a plane parallel to the pitch angle of the guide.

Referring first to Figs. 1 to 4 of the drawings, the machine for carrying out the method of flat finish grinding the side surfaces or lands of a helical guide comprises a bed or base 20 having mounted thereon the following: a reciprocable table 21, a band drum housing 22 and a tail stock 23 for supporting one end of the helical guide which is to be operated upon. Mounted on the reciprocable table 21 for movement therewith is a grinder stand 24 and a rotatable table 25 which carries a sine bar 26. Rotatably mounted within the band drum housing 22 is a band drum 27 which is adapted to be rotated through movement of a drum slide 28 by the sine bar 26 in a manner presently to be described.

The reciprocable table 21 is adapted to be reciprocated longitudinally over the bed 20 by any suitable means, for example, by a hydraulic mechanism 29 mounted on the bed.

The band drum housing 22 is provided with suitable bearings 30 for rotatably supporting the band drum 27, to which rotation may be imparted through two sets of bands or tapes 31 and 32, each set of bands having one of their ends connected to the drum 27 and their other ends connected to the drum slide 28, the connections of the respective band sets to the slide being at longitudinally spaced distances apart on said slide. Preferably the band connections to the slide are made to whippletrees 33 and 34 which are pivotally mounted at the ends of said slide, the bands partially encircling the drum in opposite directions whereby the respective sets of bands will wrap and unwrap from the drum as the slide is moved. The whippletrees are mounted in any manner whereby tension may be applied to the bands. The slide 28 is movable between anti-friction guides 28a and 28b mounted in the band drum housing 22.

The tail stock 23 is adjustably mounted in ways 35 formed in the bed 20 and a center 36 is mounted within the tail stock so as to be adjustable vertically in a well known manner for true axial alignment with the axis of the head stock, presently to be described.

Figure 1A:
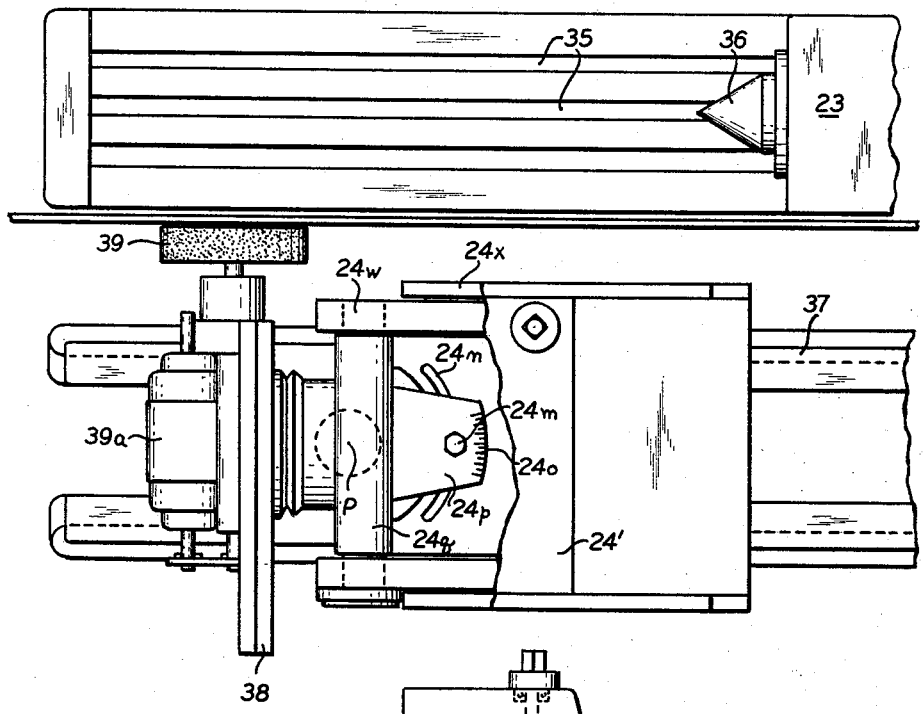
Fig. 1A shows a fragmental top plan view of a machine having means for tilting the grinder head about a transverse horizontal axis.
Figure 2A:
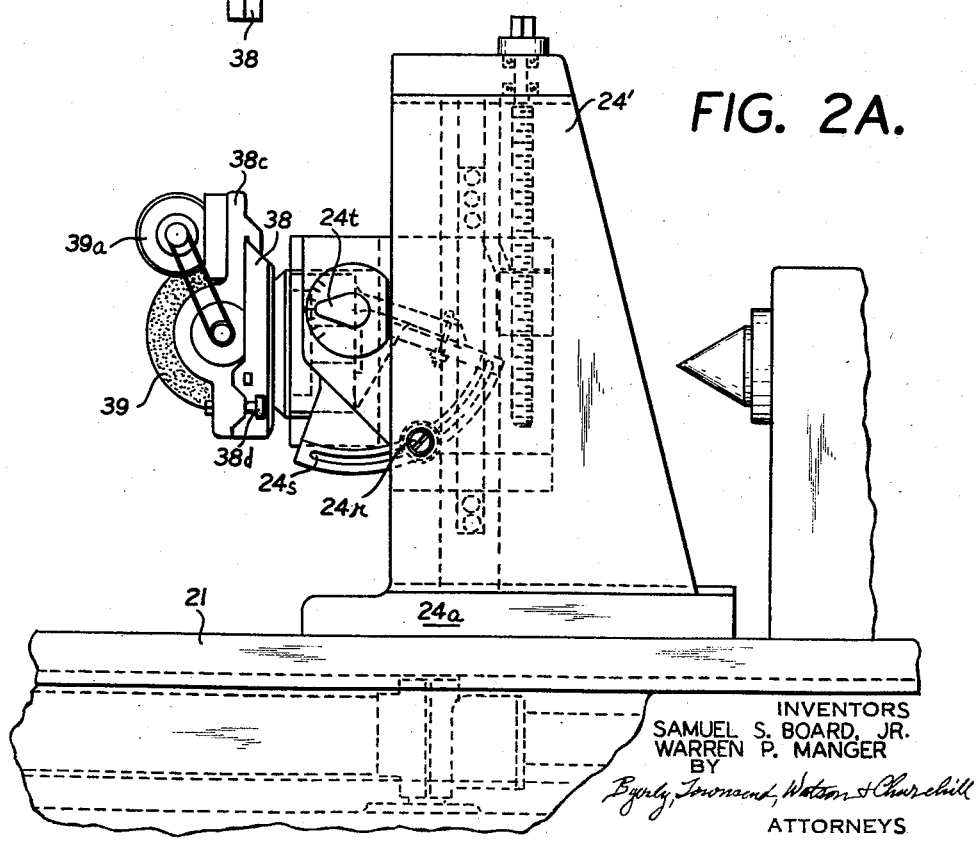
Fig. 2A shows a front elevational view of Fig. 1A.

The grinder stand 24 may be of any desired construction and comprises a base 24a adapted for adjustment longitudinally of the table 21 along ways 37 formed therein and a superstructure 24b which carries a grinder head 38 mounted for transverse adjustment along ball-bearing ways 38a formed in the grinder stand superstructure, and said grinder head carries a grinding wheel 39 and its driving motor 39a. Vertical adjustment for the grinder head 38 is provided by a vertically-extending screw 24c carried by the grinder head and extending through the top of the grinder stand superstructure and operable by a rotatable handle 24d. Angular adjustment of the grinder head about a vertical axis is accomplished by freely swivelling the grinder stand superstructure 24b in circular ways 24e on the base 24a through the medium of a gear segment 24f and a pinion 24g. Through the agency of the transverse, vertical and angular adjustment of the grinding head 38, the necessary setting for the angular precedence or succedence of the grinding wheel may be readily accomplished. To provide an angle of precedence for the grinding wheel 39 in a direction parallel to the pitch plane of the helix, a swivel adjustment may be provided to tilt the superstructure of the stand about a transverse horizontal axis as shown in Figs. 1A and 2A wherein all the adjustments embodied in the superstructure of the stand shown in Figs. 1 and 2 are present although in slightly different orientation.

The amount of angle of precedence adjustment is made about the center P. The method of making this adjustment is by loosening the through bolt 24m which engages in an arcuate slot 24n. Graduations 24o are provided for this purpose on a tongue 24p. By tapping the tongue through which the bolt 24m extends either forward or backward the proper number of degrees and retightening the bolt the angle of precedence will be obtained since the tongue causes the grinding head 24l in its slide to pivot around the center of the P dimensioning.

The pivot allowing the angle precedence adjustment is actually a frame 24w mounted at each end in anti-friction bearings (not shown) within a frame 24x, which latter can be tilted around a horizontal pin 24q also mounted on anti-friction bearings (not shown) and permitting the head to be swivelled up and down plus or minus 45°. Here again use is made of a bolt 24r engaging through an arcuate slot 24s to permit the setting of this adjustment. By setting an indicator 24t on the end of the pin 24q it will be obvious that the angle of precedence at this point will then have to be made in a plane which is parallel to the helix angle. Other adjustments are provided to bring the grinding wheel into suitable position to the helical guide and for this purpose such adjustments are substantially the same as in Figs. 1 and 2.

The rotatable table 25 is pivotally mounted on the reciprocable table 21 through a stud shaft 40 (Fig. 4) and is adapted for angular adjustment relatively to the line of movement of the reciprocable table through the medium of a worm wheel 41 carried by the rotatable table, a worm 42 carried by the reciprocable table 21, the shaft 42a of said worm being carried by the table 21 and adapted to be rotated by a suitable tool. The rotatable table 25, after proper angular adjustment, may be locked in said adjustment through a plurality of locking bolts 43 carried by the table 25 and T-locking nuts 44 movable in an annular T-slot 44a formed in the table 21.

The sine bar 26 is preferably a two-piece assembly consisting of a lower piece 26a and an upper piece 26b, the lower piece being bolted to the rotatable table 25 by bolts 45 and dowels (not shown) and the upper piece is secured to the lower piece by bolts 46. Horizontal adjusting screws 45b are provided alternately between the hold-down bolts 45 and 46 to adjust the bar 26b to as near perfect straightness as possible after final assembly. The sine bar 26 is connected to the drum slide 28 by a series of three rollers 47 which engage the opposite sides 26c of the upper piece 26b, which rollers automatically adjust to different adjustments of the sine bar by being carried by a bracket 48 which is pivotally supported by the drum slide 28. It will thus be seen that as the table 21 is reciprocated by the hydraulic mechanism 29, said table carries with it the angularly adjusted sine bar 26 which is engaged by the rollers 47 carried by the drum slide 28, that the drum slide will be moved perpendicularly to the moving table and, when so moved, the bands or tapes 31, 32 will wrap around or unwrap from the band drum 27, causing a rotary motion thereof which is directly proportional to the linear movement of the table 21.

Referring now to Figs. 5, 6 and 7 of the drawings, it will be seen that the band drum 27 carries a center 49 and a head stock 50, which latter is provided with chuck jaws 51 for the purpose of attaching the band drum 27 to a cylindrical work piece 52 having a helical cam groove therein to be operated upon and for supporting said work piece during the grinding operation. The band drum housing 22 and the head stock 50 are also herein shown as provided with means for facilitating indexing the work piece and for controlling the depth of cut to be made therein, and said means comprise a worm wheel 53 mounted on the head stock, in engagement with a worm 54 mounted on a shaft 55 supported in bearings 56 in a secondary housing 57 which is pivotally connected at 58 to the band drum housing 22. The worm 54 is held in mesh with the worm wheel 53 by an eccentrically mounted cylinder 59 carried by the drum housing 22, the eccentric 59 being movable by a handle 60, so that, upon releasing the housing 57, it may be lifted to disengage the worm 54 from the worm wheel 53 so that the work piece may be rotated by hand, either for the purposes of truing up the work or to allow speedy indexing from land to land on the cylindrical cam or guide. Connected to the worm shaft 55 is another small worm wheel 61 which meshes with a worm 62 mounted on a shaft 63, one end of which extends through the housing 57 and carries a graduated dial 64. It will be readily appreciated that rotation of the dial 64 will provide for micrometric adjustment of the worm wheel 53 and rotation of the work piece or guide for progressive grinding cuts. The chuck jaws 51 are so mounted to provide clamping of the work piece for rotation and yet provide a fine adjustment by means of set screws 65 for truing up the work piece or guide. By said means an extremely accurate synchronism between the rotation of the work and the linear progression of the table upon which the grinding wheel is mounted can be provided. Such truing up of the work piece can also be determined by the lead or helix checker which may be carried by the grinder head.

It will be recognized that a machine of the type described and for the purpose set forth must have extreme accuracy, which can only be attained by absolute concentricity of rotation of the band drum 27 with little or no clearance in any of the various connections between the drum 27 through the bands 31, 32, the drum slide 28, the pivot bracket 48, the sine bar 26, and tables 21 and 25. Accordingly, preloaded antifriction bearings are employed wherever found necessary and as shown in the drawings but not described specifically. By the same token, the entire mechanism must have rotational rigidity, wherefore the band drum 27 is made of large size and multiple bands and adjustable whippletrees are employed.

In use of the machine as shown and described for flat finish grinding the land of a helical guide, the guide 52 is first mounted between the centers 36 and 49 and the axis of the guide is then trued up parallel to the line of linear movement of the reciprocable table 21. When this is done, the helical guide is clamped in the chucks 51 and indexed to position the helical groove by raising the housing 57 about its pivot 58 and manually rotating the guide. When indexed, the housing 57 is lowered and the eccentric 59 brought into clamping engagement with said housing. The grinding head is then adjusted in the three rectilinear coordinate planes and angularly with respect to the reciprocable table 21 to give to the axis of the grinding wheel an angle of precedence as shown in Figs. 9–12 so that an imaginary line on the peripheral surface of the grinding wheel will be tangent to the innermost and the outermost parts of the land of the helical groove in the guide. This setting of the grinding wheel can be made by trial and error to an optimum condition in a matter of 15 to 30 minutes, or the desired setting of the grinding wheel axis may be obtained from mathematical tables which can be worked up for helical grooves of different angularity and cylinder diameters. The machine is then set in motion and if the set-up has been properly made, the grinding wheel will traverse the guide land to take a finishing cut therefrom of the character desired. The depth of additional grinding cuts to be made will be controlled by degree to which the index dial 64 is rotated. The flatness of the land and the helix angle thereof can be checked either simultaneously with the grinding operation where a lead angle checker is mounted on the grinding head or by a separate checking instrument adapted to be supported on the table 21.

Figure 8:
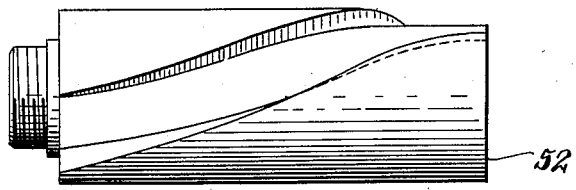
Fig. 8 shows a side elevation of a helical guide member or cam, a type of member to which the present invention is directed.

The cylindrical cam or helical guide, Fig. 8, requires a machine of the type described above to perform the following. The helical ledge or land as shown in Fig. 8, is made up of a locus of lines, the inner and outside edges signified by the intersection of the various helical angles shown in Figure 9 and the grinding wheel 39 is placed with its periphery coincidental with this intersection. In this view $\theta$ represents the pitch line (or nominal) helix of the guide and its position on the helical ledge or land of the guide may be midway between the innermost edge and the outermost edge or at some other position at discretion of the designer. The lead, of course, is the axial distance required for the helix to make one complete revolution of the cylindrical cam and, therefore, the tangent of $\theta$ is equal to $$\frac{1\pi r}{L}$$

where $r$ is the radius from the axis of the cylindrical cam to the pitch line and $L$ is the lead of axial distance for one complete revolution. It is obvious that each radial portion of this helical ledge or land must have the same lead and therefore must have a different helix angle. In Fig. 9, $\theta_1$ represents the smallest helix angle, the smallest radius for the inside edge of the ledge, while $\theta_2$ represents the outermost edge. If the cylindrical surface of the grinding wheel 39 engages this cam flank with its axis perpendicular to the plane of the axis of the cylindrical cam, by inspection, it can be seen that to the left of the intersection the grinding wheel will remove excess material from $\theta_2$ and on the inside edge, excess material from $\theta_1$. In other words, it will be impossible to produce a flat face to the cylindrical cam land. A flat cylindrical cam land can be produced, however, by causing the inner edge 39' of the grinding wheel 39 to precede the outer edge 39'' of the helix as shown in Figures 10 and 12. Fig. 11 shows the inner edge 39' succeeding and this even though the outermost edge was tangent to $\theta_2$ and the innermost edge to $\theta_1$, the essential portion would not be tangent to $\theta$. Therefore, again not producing a flat face. By causing the inner edge to precede, as shown in Fig. 10, where the axis of the grinding wheel is twisted in a plane parallel to the axis of this cylindrical cam a condition is achieved whereto all intents and purposes the cylindrical surface of the grinding wheel becomes tangent to $\theta_1$ and $\theta_2$ thereby grinding a flat face. In addition, if the innermost edge is caused to precede the outermost edge in a plane parallel to the pitch line of the helix $\theta$ as shown in Fig. 12, a condition slightly superior to Fig. 10 (not enough to make it practical to incorporate the additional expense and procedure of a new adjustment in the grinding head), is achieved. Again this is achieved when $\theta_1$ and $\theta_2$ and $\theta$ become tangent to the cylindrical surface of the grinding wheel.

Although but a single embodiment of a machine has been shown and described for performing the method of the invention, it is to be understood that such machine may be modified within the range of engineering skill without departing from the spirit of the invention as defined in the appended claims.

What we claim is:

1. The method of flat finish grinding a land of a helical groove in a cylindrical member so that all points on the width of the land will lie on radii of the cylinder, said method comprising mounting said cylindrical member for rotation about its axis, mounting a rotatable cylindrical grinding wheel so that an imaginary line on the peripheral grinding surface thereof will be in tangential relation to the surface of the guide land from the innermost to the outermost parts of the land, and imparting to said grinding wheel while rotating on its axis a motion of translation parallel to the axis of the cylindrical member while causing a rotary motion of the cylindrical member directly proportional to the motion of translation of the rotary grinding wheel.

2. The method according to claim 1, wherein the angular adjustment of the axis of the grinding wheel is made in a horizontal plane to bring the axis of the grinding wheel into non-perpendicular relation to the axis of the cylindrical member.

3. The method according to claim 1, wherein the angular adjustment of the axis of the grinding wheel is made in a plane parallel to the pitch plane of the land of the helical groove in the cylindrical member.

4. The method according to claim 1, wherein the angular adjustment of the axis of the grinding wheel provides an angle of precedence with respect to the radius of the cylindrical member lying in said land.

5. The method of flat finish grinding a land of a helical groove in a cylindrical member so that all points on the width of the land will lie on radii of the cylinder, said method comprising mounting said cylindrical member for rotation about its axis, mounting a rotatable cylindrical grinding wheel so that an imaginary line on the peripheral surface thereof will be tangent to the innermost and outermost parts of the land, said condition being obtained by making an angular adjustment to the axis of the grinding wheel in a plane parallel to the pitch plane of the helix of the cylindrical member and imparting to said grinding wheel while rotating on its axis a motion of translation parallel to the axis of the cylindrical member while causing a rotary motion of the cylindrical member directly proportional to the motion of translation of the rotary grinding wheel.

6. A machine for flat finish grinding and checking the lands of a helical guide cam groove in a cylindrical member, comprising in combination, a machine bed having mounted thereon the following: a reciprocable table movable parallel to the axis of the helical guide to be finish ground, a tail stock for the cylindrical member, and a band drum housing having a band drum rotatably mounted therein supporting a head stock for the helical guide; the table having mounted thereon and movable therewith a grinding head carrying a grinding wheel which is adjustable in rectilinear coordinate planes and also angularly in relation to the table; said grinding wheel having a cylindrical peripheral surface adapted by the adjustable means for the grinding head to be brought into tangential engagement with the innermost and outermost parts of the land of the cam groove of the cylindrical member when mounted between the head stock and the tail stock; a drum slide movable perpendicularly to the axis of the band drum; bands connected to the drum slide and to the drum adapted to rotate the drum as the slide moves; an angularly adjustable sine bar mounted in movable engagement with the drum slide, the drum slide and the sine bar being movable perpendicularly one by the other, means connecting the sine bar and the table so that movement of one imparts movement to the other; and the parts being so oriented that movement of the drum slide will cause a rotational movement of the band drum and the head stock carried thereby which will be proportional to the linear movement of the table and the grinding head carried thereby.

7. A machine according to claim 6, wherein the sine bar is carried by and movable with the reciprocable table, and means for reciprocating the table so that movement of the sine bar will cause rotational movement of the band drum.

8. A machine according to claim 6, wherein the sine bar is carried by and movable with the reciprocable table and angularly adjustable relative to the direction of movement of the table.

9. A machine according to claim 6, wherein the sine bar is mounted on a rotatable table which is carried by and angularly adjustable relative to the direction of movement of the reciprocable table, and means for locking the rotatable table in adjusted position to the reciprocable table.

10. A machine according to claim 6, wherein the sine bar is connected to the drum slide by a plurality of rollers which engage the opposite sides of the sine bar, said rollers being supported on a bracket which is swivelly carried by the drum slide, whereby the slide is held in engagement with the sine bar at any angular setting of the sine bar.

11. A machine according to claim 6, wherein the drum slide is connected to the band drum by two sets of bands, each set of bands having one of their ends connected to the drum slide and their other ends connected to the band drum, the connections of the respective band sets to the drum slide being at longitudinally spaced distances apart with the bands partially encircling the drum in opposite directions, whereby the respective sets of bands will wrap upon and unwrap from the drum as the drum slide moves.

12. In a machine for flat finish grinding and checking the lands of a helical guide cam groove in a cylindrical member, comprising a machine bed having mounted thereon a band drum housing having a band drum rotatably mounted therein; a head stock and a tail stock for rotatably supporting a cylindrical member to be operated upon; said head stock being carried by the rotatable drum and having a primary worm wheel; a secondary housing pivotally supported on the band drum housing; a shaft mounted in said secondary housing; a worm mounted on said secondary housing shaft; said worm being normally in mesh with the primary worm wheel and manually movable out of such meshing engagement by raising the secondary housing about its pivotal connection.

13. A machine according to claim 12, wherein a secondary worm wheel is mounted on the worm shaft; a secondary worm is in mesh with the secondary worm wheel; and a shaft upon which said secondary worm is mounted projects through the secondary housing whereby rotation of said last-mentioned shaft operates to provide a micrometric rotation of the primary worm wheel and of a cylindrical member when supported by the head stock.

14. A machine according to claim 13, wherein a graduated dial is carried by the secondary worm shaft.

References Cited in the file of this patent

UNITED STATES PATENTS

| | | |
|---|---|---|
| 1,159,739 | Bock | Nov. 9, 1915 |
| 2,187,062 | Sykes | Jan. 16, 1940 |
| 2,258,510 | Laessker | Oct. 7, 1941 |
| 2,376,110 | Aeppli | May 15, 1945 |